(12) United States Patent
Gallagher

(10) Patent No.: US 6,450,013 B1
(45) Date of Patent: Sep. 17, 2002

(54) RESONANT STRUCTURES FOR TRANSDUCERS

(76) Inventor: John G Gallagher, 77 Town Street, Old Malton, Malton, North Yorkshire (GB), YO17 0DH (*) Notice: Subject to any disclaimer, the term of this patent is extended or adjusted under 35 U.S.C. 154(b) by 0 days.

(21) Appl. No.: 09/622,311
(22) PCT Filed: Feb. 10, 1999
(86) PCT No.: PCT/GB99/00421
§ 371 (c)(1), (2), (4) Date: Aug. 31, 2000
(87) PCT Pub. No.: WO99/41735
PCT Pub. Date: Aug. 19, 1999

(30) Foreign Application Priority Data
Feb. 12, 1998 (GB) .............................. 9802907

(51) Int. Cl.[7] .............................................. G01N 11/16
(52) U.S. Cl. .................... 73/54.25; 73/24.06; 73/64.53; 73/32 A; 73/580
(58) Field of Search .......................... 73/54.24, 54.25, 73/54.26, 54.41, 24.05, 24.06, 32 A, 64.53, 580, 19.03

(56) References Cited
U.S. PATENT DOCUMENTS 3,712,117 A  1/1973  Fitzgerald et al. ......... 73/54.26
4,857,792 A  8/1989  Miura et al. ................. 310/323
5,723,771 A  3/1998  Miura et al. ................ 73/54.24

FOREIGN PATENT DOCUMENTS

DE   915 792 C    7/1954
GB   2 281 621 A  3/1995

OTHER PUBLICATIONS

Patent Abstract of Japan vol. 97, No. 001, Jan. 31, 1997, Abstract of JP 08247917 A (Yamaichi Electron Co Ltd) Sep. 27, 1996.

Primary Examiner—John E. Chapman
(74) Attorney, Agent, or Firm—Nixon & Vanderhye P.C.

(57) ABSTRACT

A transducer includes a resonant structure having a first spring-mass system extending to a connection mass or nexus to which is connected a second spring-mass system, which includes a sensing element. The two spring-mass systems vibrate in antiphase. The nexus is connected to a mechanical datum provided by a mounting by means of a semi-rigid connection member which is preferably stiffer than the first member and which can control the relative motions of the first and second spring-mass systems. The sensing element contains a re-entrant resonator constituted by a spring-mass system, which can be used to adjust the characteristics of the transducer.

7 Claims, 5 Drawing Sheets

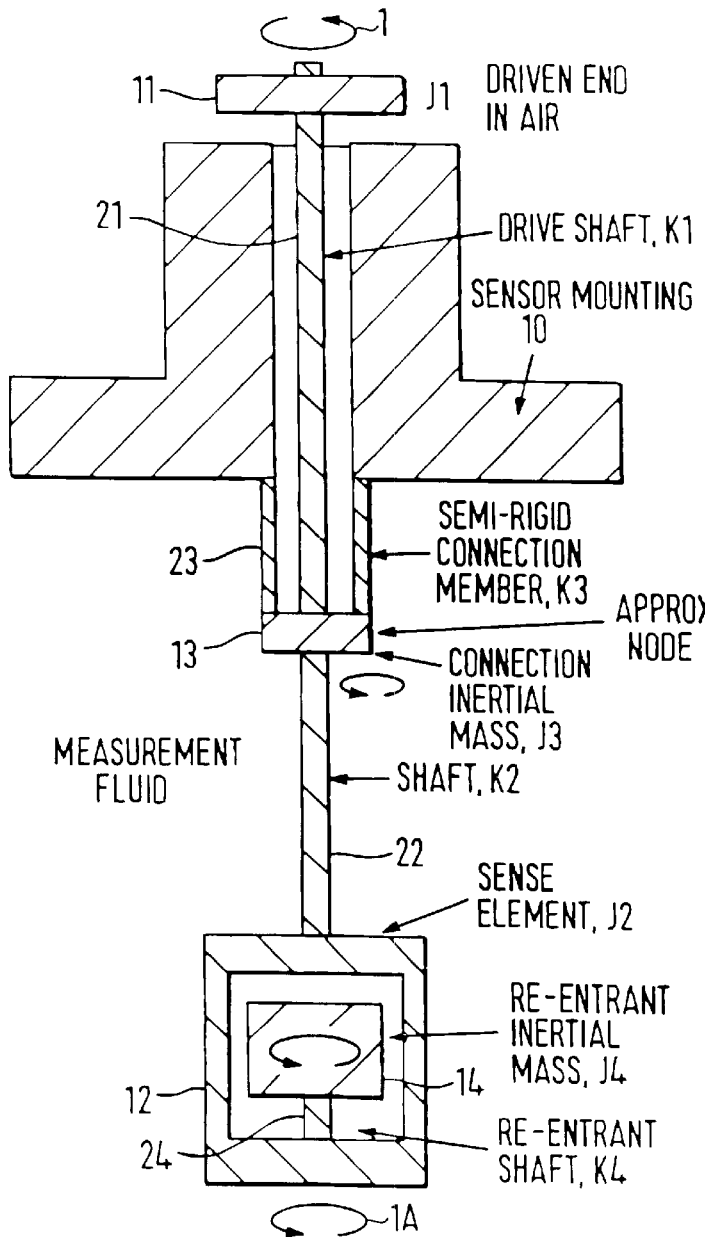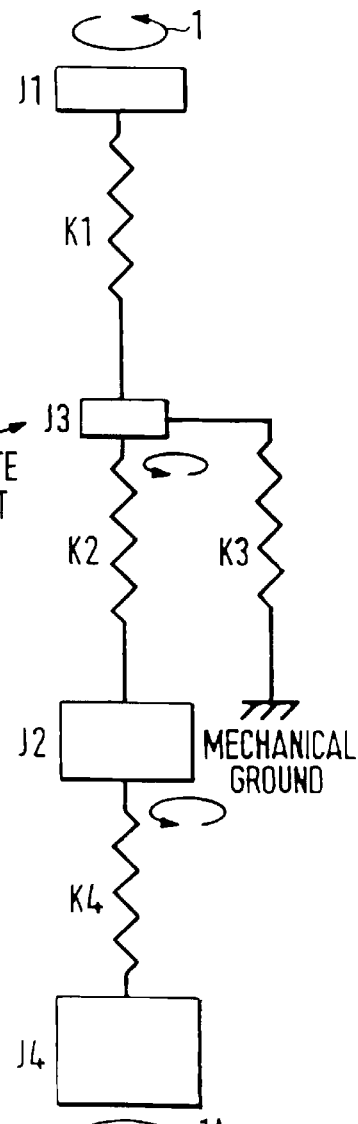
FIG. 1A
FIG. 1B
SPRING MASS MODEL

SPRING MASS MODEL

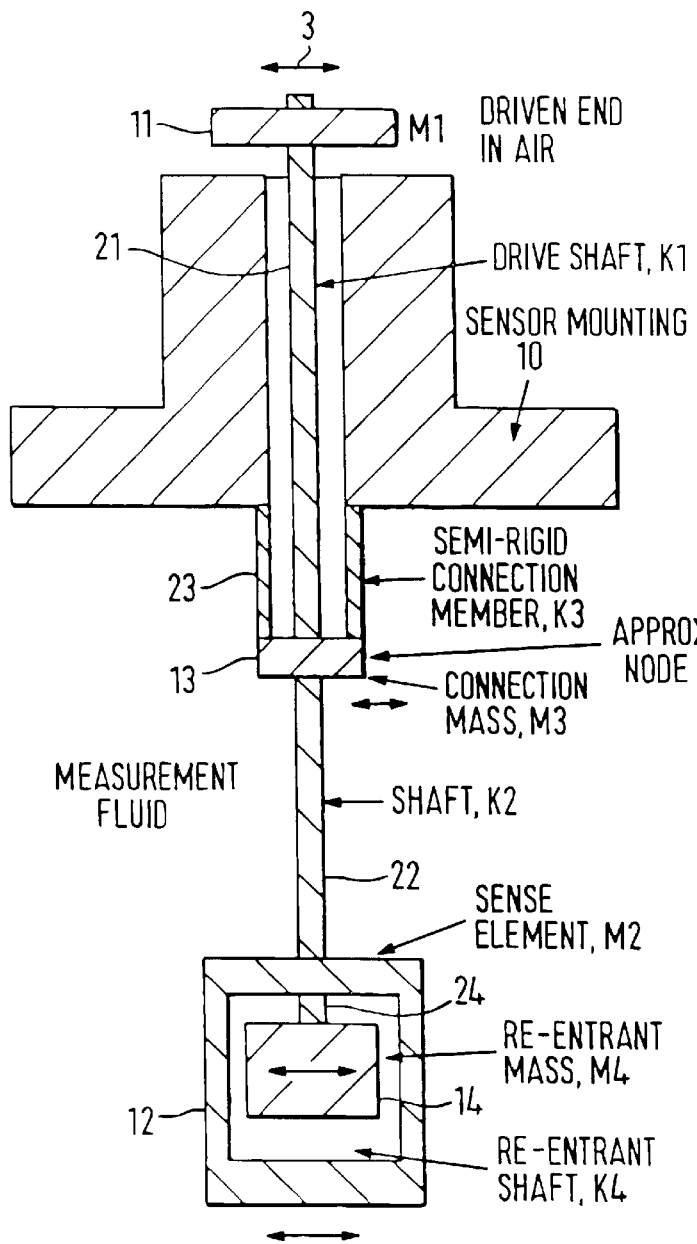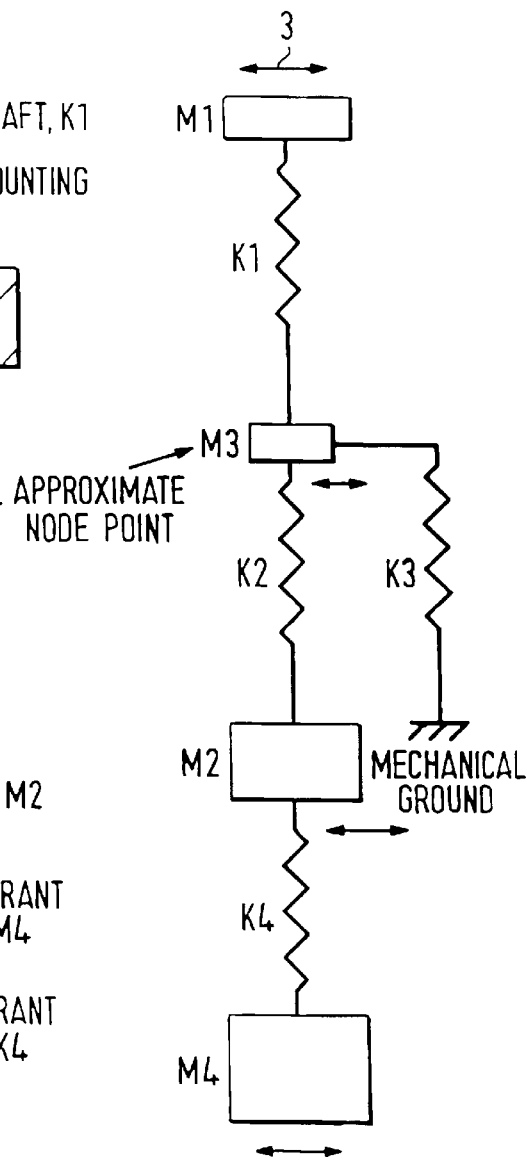
FIG. 3A
FIG. 3B

1

RESONANT STRUCTURES FOR TRANSDUCERS

BACKGROUND OF THE INVENTION

1. Field of the Invention

This invention relates to transducers and to resonant structures for transducers, particularly structures which comprise a first member, which may be driven into vibration, and a second member, which may carry a sensing element and is disposed in a medium of which a property is to be measured.

2. Related Art

Various transducers including structures of this general nature are known. In known arrangements, the first and second members are intended to vibrate in antiphase, there being a vibrational node of normally zero displacement at a connection by means of which the vibrating structure is supported. Known arrangements of this kind are disclosed in U.S. Pat. No. 3,712,117 and GB-B-2281621. In these designs, the nodal point is connected to a mechanical datum by a flexible means which is substantially more compliant than the first and second members, Theoretically, in these devices, the amplitude and frequency of vibration, which may be torsional or lateral or longitudinal of the first member are the same as those of the second member carrying the sensing element immersed in the medium, which may be gas, liquid or even solid.

SUMMARY OF THE INVENTION

One important feature of the present invention is the use of a semi-rigid connecting member between the nexus of the first and second members and a support. The semi-rigid member is intended to have a stiffness which significantly affects, and preferably controls, the relative motions of the first and second members. It preferably provides a node which is more rigid than the first and second members. This kind of member can avoid the disadvantage of very compliant mounts, which are generally unable to withstand the high pressures and forces encountered in many industrial applications. Moreover, the stiffness of the connecting member or means may be selected to control the sensitivity of the measuring instrument of which the transducer forms a part.

A further feature of the invention is the use of a re-entrant member or resonator enclosed within a sensing element which preferably forms part of the second member but which may have utility independently of the connecting member mentioned above. Such a re-entrant element is intended to vibrate relative to the sensing element, being constituted preferably by a spring-mass structure, but unaffected by the medium in which the sensing element is immersed. Such a re-entrant element or additional resonator may enable the alteration of the characteristics of the transducer in a simple and reliable manner.

Other features of the invention will be apparent from the description which follows.

BRIEF DESCRIPTION OF THE DRAWINGS

FIGS. 1A and 1B illustrate a resonator structure according to the invention, FIG. 1A illustrating the mechanical structure and FIG. 1B being a schematic model of the structure;

FIGS. 2A, 2B and 3A, 3B illustrate similar structures to that shown in FIGS. 1A and 1B, but operable in different vibrational modes, FIGS. 2A and 3A illustrating the structures and FIGS. 2B and 3B the schematic models;

DETAILED DESCRIPTION

Figures 2A, 2B:
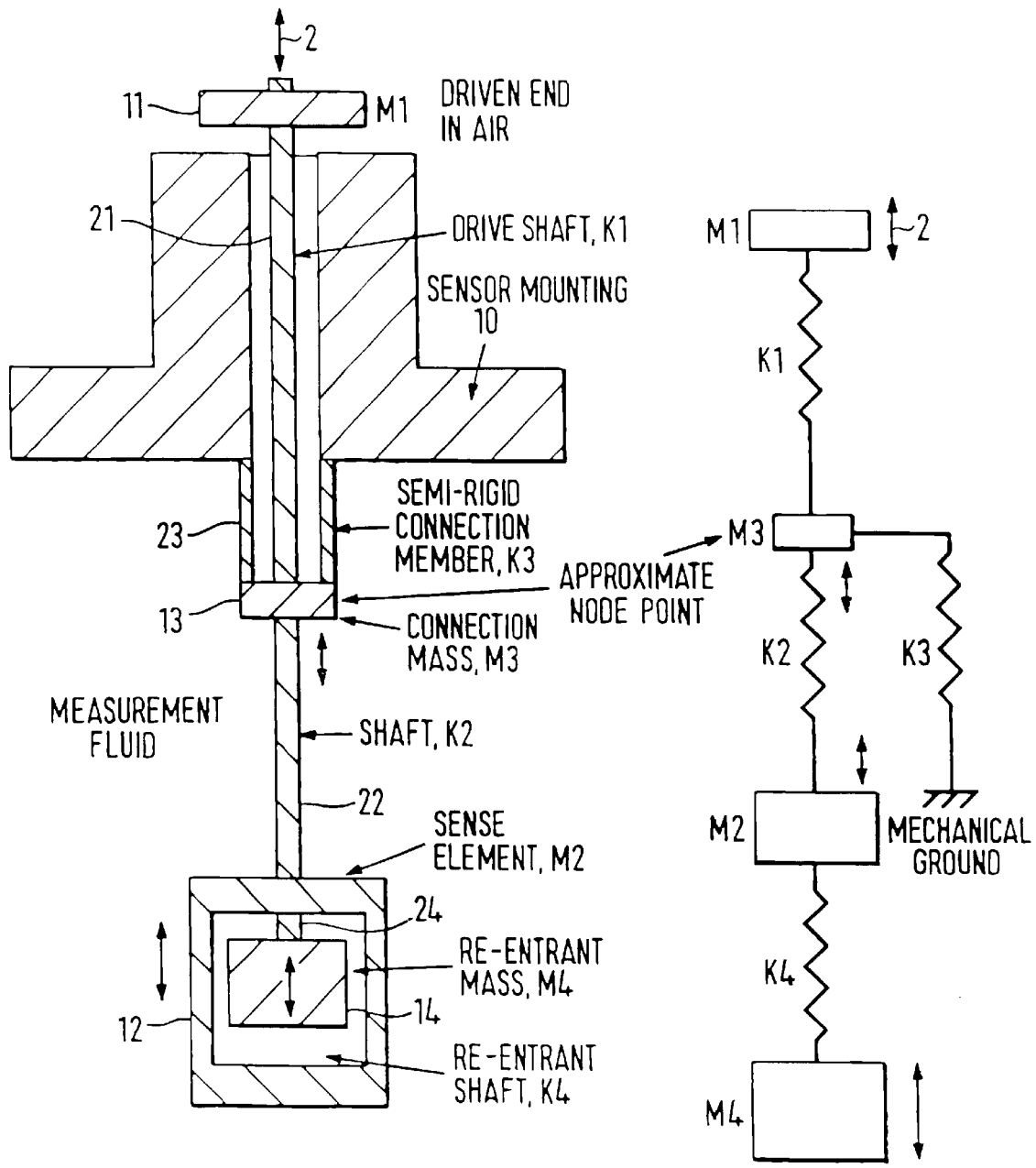

FIGS. 1A, 1B, 2A, 2B, 3A and 3B each show a resonator structure forming part of a transducer for the measurement of properties of a medium, and including a first member 11, 21, composed of an inertial mass 11 and a shaft 21. A second member of which the inertial mass is preferably constituted by a sensing element such as a paddle 12 includes a second shaft 22, the shafts 21 and 22 having a connection region, hereinafter called nexus 13. The nexus is itself supported by a connection member, in this example a tube 23, which is secured to a mounting base 10.

Preferably the base and the connecting member define two distinct regions, one above and one below the mounting member so that for example the sensing element 12 may be disposed in a medium which is to be measured and the first member (which may be electromagnetically driven) can vibrate in air. However, other configurations are possible.

The difference between FIGS. 1A, 1B, 2A, 2B, 3A and 3B lies in the different modes of vibration experienced by the respective structures. The structure showing FIGS. 1A, 1B is intended to vibrate torsionally, the first member twisting as shown by the arrow 1 and the lower member twisting in the opposite direction as shown by the arrow 1A. In the structure of FIGS. 2A, 2B, the members are intended to vibrate longitudinally, as exemplified by the double headed arrow 2 above the member 11. In the structure shown in FIGS. 3A, 3B, the members are intended to vibrate laterally, as shown by the double headed arrow 3. The driven end can be stimulated and sensed by a variety of means, electromagnetic force and field, piezoelectric stress and stain, acoustic pressure, or electrostatic force and field.

The structures also include, as will be explained later, a re-entrant resonator. In FIGS. 1A, 1B the sensing element 12 is a hollow paddle or cylinder and within the sensing element, physically separated from the medium surrounding the sensing element, is a mass 14 connected to the sense element by a shaft 24. In each of the FIGS. 1A, 1B, 2A, 2B, 3A and 3B there is shown a similar resonator, which is intended to vibrate in essentially the same mode, torsional, longitudinal or lateral as the remainder of the respective system vibrates.

The transducer illustrated comprises three and preferably four independent torsional spring-mass systems connected as shown in FIG. 1B. Equivalent systems for longitudinal vibration and lateral vibration are shown in FIG. 2B and FIG. 3B. For convenience, the following description is mainly concerned with torsional vibration.

The following description uses the: notation wherein J1 and K1 are the inertial mass and stiffness of the first member (11,21), J2 and K2 are the inertial mass and stiffness of the second member and so on.

Spring mass systems formed by J2, K2 and J4, K4 are in phase with each other, whereas system J1, K1, is 180° out of phase. If inertial mass and shaft stiffness K are appropriately selected for each system then a point of minimum vibration is formed at the inertial mass J3, which is connected to a element of stiffness K3. The balanced node condition is achieved when the frequency of vibration of J1 ($\omega_1$) equals frequency of vibration of J4 ($\omega_4$) Mathematically this is represented as For $J1, K1$ $\omega_1 = \sqrt{K1/J1}$ or any higher harmonic modes of vibration For $J2$, $K2$ and $J4$, $K4$ $\omega_4=\sqrt{((\alpha^2(K1+K2)+K2-2\alpha K2)/(\alpha^2 J1+J2))}$ or any higher harmonic modes of vibration, where $\alpha = K2/(K1+K2)$.

The balance condition for node is given by $\omega_1=\omega_4$, wherein J is the polar mass moment of inertia, K is the torsional stiffness and $\omega$ is the resonant frequency of the spring-mass system.

For the systems in FIGS. 2B and 3B:

for $M1$, $K1$ $\omega_1=\sqrt{K1/M1}$ or any higher modes of vibration

For $M2$, $K2$ and $M4$, $K4$ $\omega_4=\sqrt{((\alpha^2(K1+K2)+K2-2\alpha K2)/(\alpha^2 M1+M2))}$ or any higher harmonic modes of vibration, where $\alpha = K2/(K1+K2)$.

The balance condition for node is $\omega_1=\omega_4$ wherein M is the stiffness and $\omega$ is the resonant frequency of spring-mass system.

As previously mentioned, other designs include an antiphase shaft system with connection of the node point to mechanical ground by a highly compliant means of no specific magnitude. The application described here has no such highly elastic point since this would produce a structurally weak location, unable to withstand the high pressure and forces encountered in many industrial applications. Instead the elastic point is replaced with a specific semi-rigid member 23.

This member 23 is designed to accommodate some residual movement at the nodal region. The nodal region has only an approximate definition due to a loss of the balance condition of matched frequency caused by the mass loading of fluid on the inertial masses and variance of stiffness due to temperature, i.e. the condition of $\omega_1=\omega_4$ cannot be guaranteed in the working life of the instrument.

The rigidity of the member 23 imparts high structural strength and stability of alignment of transducer components whilst under the rigours of industrial use. It also, importantly, controls the amount of torsional torque imparted from one side of the fluidic divide, from the shaft 21 into the shaft 22 on the other side, and in so doing forms a means for controlling the relative motion of the two shafts. This allows the selection of instrument sensitivity based on the value of K3.

For optimum results it has been found that structural strength and good sensitivity are provided when K3 is approximately equal to ten times K1, the rigidity of shaft 21. Structural members of this stiffness are obtained using high strength stainless steels, fully welded to the system's vibrating elements and the sensor mounting mass; this provides high structural strength and the all weld construction is beneficial in hygienic applications (no material traps) and aggressive environments (there are no seals which can perish and it facilitates the use of corrosion resistant alloys).

Figure 5:
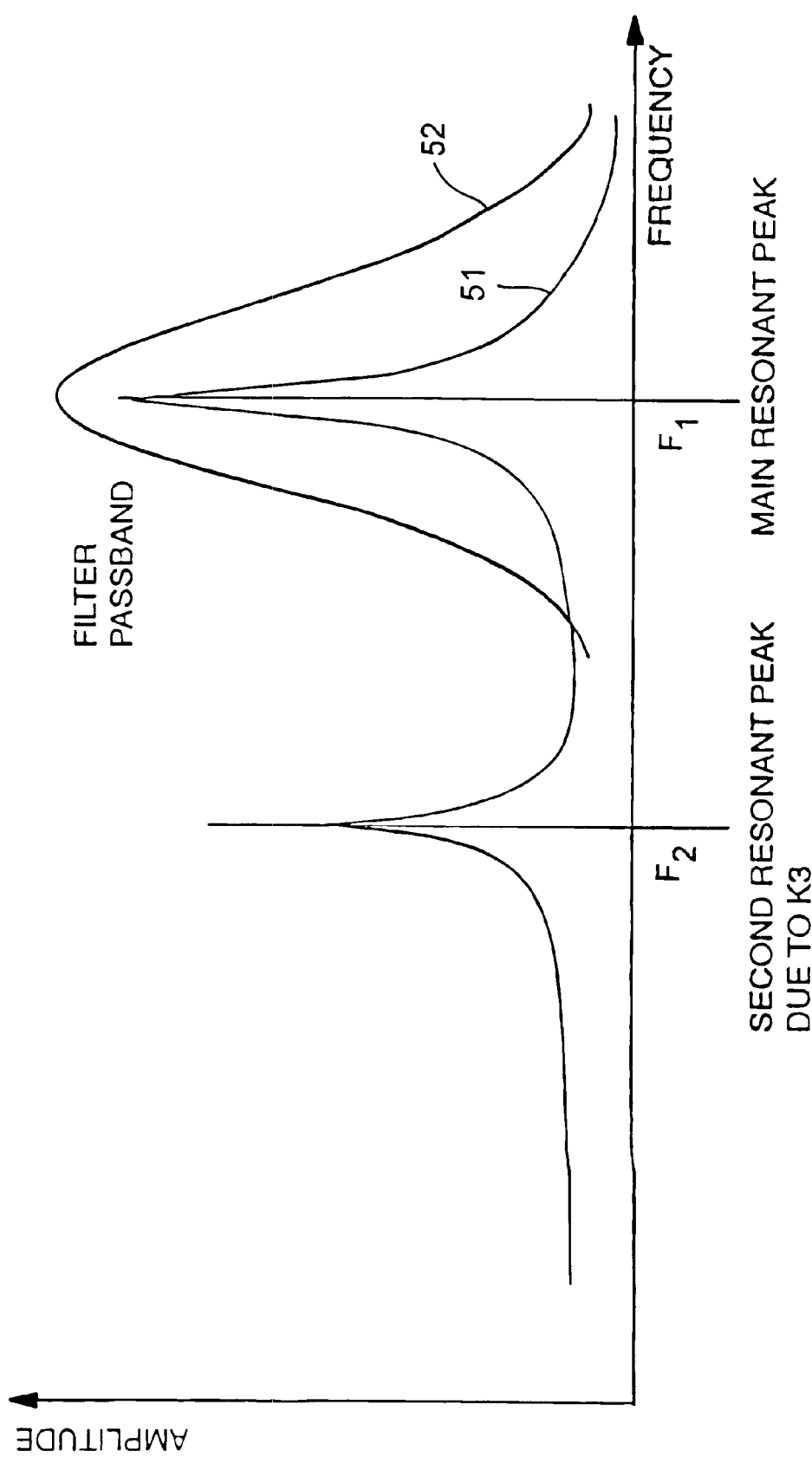
FIG. 5 is a graph of amplitude against frequency showing the effects of a connecting member.

The presence of a semi-rigid member 23 alters the main modal response of the sensor from a single resonant peak $F_1$ (FIG. 5) to that of two resonant peaks $F_1$ and $F_2$. One peak is formed essentially from the desirable interaction of K1, K2 and K4 (and their respective masses) but the second peak is a result of the substantial stiffness of K3 also interacting with these systems. This second resonant peak is undesirable and is easily removed by filtering; its elimination is further aided by increased damping at the sensor mounting, facilitated by attachment to process plant or some other fixing. The use of a metallic connection, rather than an elastomeric connection, is also preferred since metals can be selected to have a much lower damping capacity than elastomers and thus give higher Q resonators as a result.

Figure 4:
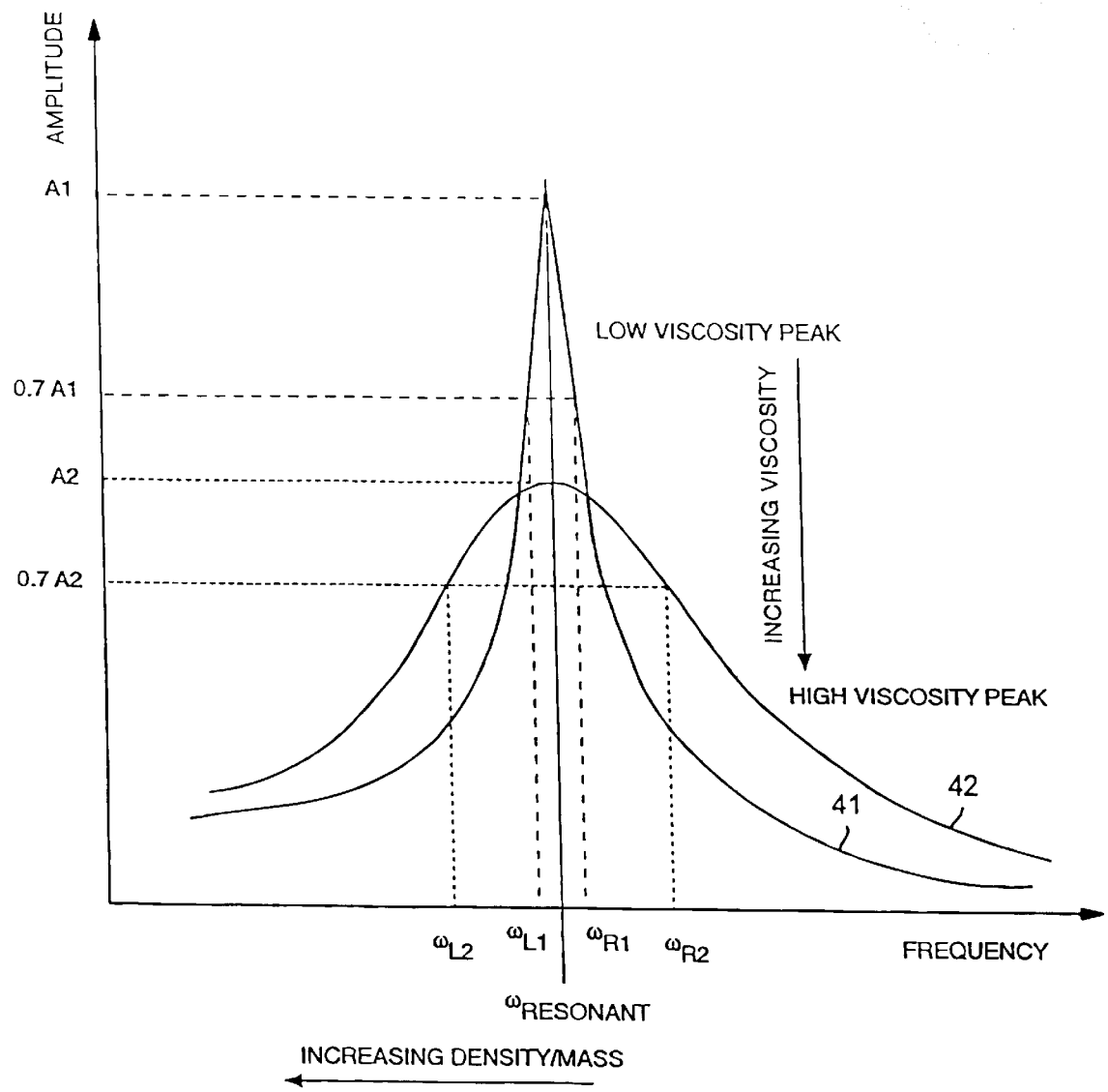
FIG. 4 is a graph illustrating variation of amplitude of vibration with frequency.

It is usual to provide a single spring-mass combination defining the sensing element. This element is exposed to the viscous effect of the fluid, increasing viscosity of the fluid causes increased damping of the sensor, which results in reduced vibrational efficiency of the system The performance of a transducer is strongly affected by vibrational efficiency, or Q-factor, so there is a degradation in performance with increasing viscosity (as shown by curves 41 and 42 in FIG. 4). A large Q-factor gives high signal to noise ratio, high sensitivity and natural rejection of mechanical vibrations outside the resonant frequency promoting immunity from plant noise.

The new design allows the Q-factor to be maintained regardless of viscosity and can deliver extremely high vibrational efficiencies (greater than 5000) at the very highest fluid viscosity (millions of centripoise). To achieve this, the design uses the spring-mass resonator combination 14, 24 mounted within the sensing element. This resonator is free from the damping effects of the surrounding fluid and maintains its torsional strain energy regardless of fluid conditions.

By selecting the relative stiffnesses of the wetted shaft 22 and the re-entrant shaft 24, the degree of vibration imparted to the sensing element can be controlled, thus defining the sensitivity of the sensor. As a result, sensors can be manufactured as a standard design and adjusted to suit any fluid viscosity range simply by minor alteration of the stiffness (i.e. diameter) of the sense element 12. This can take place with little effect on the balance condition (equal frequencies) at the node since in most cases the resonant frequencies will be determined by J1, K1 and J4, K4, rather than K2 (so long as K2>>K4). The characterisation of performance of a transducer by simply adjusting one dimension results in improved manufacturing efficiency and is thus commercially beneficial.

The drive end 11 of the resonator shown in FIG. 1A, is stimulated into torsional vibration by applying a twisting moment using a ferrous bar fixed normally to the shaft. An electromagnet positioned some distance from the centre of rotation applies an electromagnetic force to the ferrous bar,. causing it to make angular displacements. The current to the electromagnet is switched or modulated at the resonant frequency of the spring-mass system causing the arrangement to vibrate at a resonant frequency. To ensure continuous vibration at this frequency one may employ a regenerative drive, in which for example an electromagnetic pick-up senses the angular movement. A signal from the pick-up is amplified and phase adjusted and then fed back to constitute a drive signal for the electromagnet. Thus, by vibrating the driven shaft at its resonant frequency using the drive and pick-up assembly the sense end of the system is made to execute torsional vibrations.

The connection 23 forms a substantial fluid barrier capable of withstanding high fluid pressure and temperature The sense element may have a selection of different end masses, or no mass whatsoever, attached to its end point. The driven end may be stimulated and sensed by a variety of means, electromagnetic force and field, piezoelectric stress and strain, acoustic pressure, or electrostatic force and field.

In the embodiment shown in FIG. 1A, all components are fabricated from stainless steel. Where connection to a process fluid is required, the transducer body can be screwed or welded to a conventional process connection such as a screwed fitting or flange. A further configuration uses two drive electromagnets and two magnetic pick-ups to promote torsional vibration and to inhibit any lateral vibrations of the shaft.

The drive shaft 11 is preferably balanced to match the frequency of vibration of the sense shaft 22 using end weights secured to the end of the shaft 11. In this way the node point is well established at the desired position and the vibrational performance of the transducer is made independent of any external stresses applied to the assembly.

If the sense element 12,22 is immersed in a liquid, the angular displacements will cause a shearing motion of through the fluid. If the fluid is viscous the combination of element surface area, angular velocity, and fluid viscosity will cause a drag force on the vibrating system and energy will be lost to the fluid. The degree of energy loss will be proportional to the amount of vibration allowed at the sense element which is defined by the ratio of K2 to K4.

The Q, or sharpness of the resonant peak, is an indication of the amount of energy lost versus the input energy to the vibrating system for each cycle of vibration. As the energy loss increases due to increasing viscosity the Q of the system decreases.

Q is determined by measuring the half power bandwidth of the resonant peak. The measured Q is then scaled to give a reading of fluid viscosity in conventional units. By adjusting the parameters of shaft stiffness, mass moment of inertia of sense element and surface area, the transducer can be selectively configured for optimum viscosity range.

If the sense end mass is geometrically configured so that fluid is displaced during vibrational excursions then there will be a mass loading effect on the sense element. Since the resonant frequency of the system is a function of the mass moment of inertia of the end element, the resonant frequency will be modulated by the density of the fluid. Thus the density of the fluid can be correlated with the frequency of the vibration of the system.

By measuring the resonant frequency of the transducer and the fluid temperature using conventional temperature sensing techniques, and applying a correction factor for the change of elasticity of the shafts with temperature, the fluid density is determined.

The resonant frequency of the transducer is decreased with the addition of mass to the end of shaft (so long as this does not increase stiffness). The frequency further decreases as the added mass is displaced further away from the axis of rotation as this increases the polar mass moment of inertia.

If the end element is made a wide and thin disk, for example having a 60 mm diameter and 0.5 mm thickness, the frequency of vibration becomes very sensitive to small changes of mass on the disk. To enable small changes in frequency due to mass changes to be differentiated from changes due to temperature a second resonator is employed. Since both sensors experience the same temperature, but only one is used for the mass measurement, the division of the frequencies from each transducer will yield a quotient that changes only with mass and is independent of temperature.

Such an instrument is capable of detecting changes in mass due to the following activities of matter placed on the disk or the disk itself:

(a) Evaporation
(b) Ionization
(c) Atomisation
(d) Absorption
(e) Deposition
(f) Wear
(g) Any other physical or chemical reaction that causes a change in mass of the disk or material placed upon the disk.

Such measurements can be made on matter in the gas, liquid or solid phase or any combination of these phases in the chemical or physical process For example, it is possible to measure the loss of mass of a liquid lacquer as it releases a gaseous solvent vapour in its drying process, this yields the mass of liquid lacquer, the mass of gaseous solvent, and the remaining solid resin.

In addition to the mass measurement, the Q of the system is measured to determine the viscosity or rheological behaviour of the disk material on the disk. This lives further analytical data for understanding the dynamic behaviour of matter in a physical or chemical process —for example the chances from liquid to solid state.

The arrangement is also useful for determining the viscosity of a droplet of fluid rather than complete immersion of the sensor in fluid. The mass balance technique determines the quantity of fluid present and this is combined with the viscous energy loss reading to determine the fluid viscosity.

Information relating to the 'skin' depth of matter can also be derived. The skin depth is the amount of fluid near a vibrating surface that contributes to the added mass of the system. It is a function of density, viscosity and frequency of vibration. As a fluid becomes more viscous (more solid) its skin depth increases; for example, if a resin is drying on the measurement surface its viscosity increases and consequently an apparent increase in mass is witnessed due to the increase in skin depth.

Many chemical reactions involve an exchange of mass between the components in the reaction. If the sensing surface of the torsional transducer is made a component in a particular chemical reaction then the progress of the reaction can be monitored by the increase or decrease in the mass at the surface. This exchange of mass can take place with reactants in the gas, liquid or solid phase.

This provides a continuous on-line measurement of a chemical reaction, determined by the type of surface chemical used and its reaction with other chemicals.

By combining the mass measurement with other reaction indicators such as redox potential, and electrolysis theory the nature of a reaction, and unknown reactants can be determined. For instance, in accordance with Faraday's Electrolysis Law, that the mass of electrolytically deposited material is a function of time, electric current and atomic mass and valency. With mass, time and current known, the deposited atoms can be determined from atomic weight/valency estimates.

Using disks prepared with the appropriate chemical composition the instrument can be used for the continuous on-line measurement of air and water contaminants. The use of the second reference resonator which has not been sensitised with the chemical composition eliminates frequency changes due to temperature or fouling.

Mass changes due to radioactive decay can be measured in a similar way.

The instrument can be used with a disk coated with a biochemical substrate which could, say, promote the growth of bacterial culture, so that a sensitive determination of the rate of growth of the culture can be made. Changes in the mass or rheological behaviour of inorganic, organic or biological matter in the gas, liquid or solid phases can be measured over time.

What is claimed is:

1. A vibratory transducer which includes a resonant structure comprising:

a first member, a second member and a nexus intermediate the first and second members, said first and second members being capable of vibration in anti phase, a connecting means which support said nexus and has a substantial stiffness, wherein said second member includes a sensing element and a vibratile resonator which is disposed within the sensing element, said resonator being thereby free from damping by a medium surrounding said sensing element.

2. A transducer according to claim 1 and including a mounting means supporting said connecting means, said mounting means and connecting means defining two distinct regions each containing one of said first and second members.

3. A transducer according to claim 2 wherein said connecting means has a stiffness substantially greater than said first member.

4. A transducer according to claim 2 wherein said connecting means comprises a metallic tubular member extending from said mounting means.

5. A transducer according to claim 1 wherein said resonator comprises an inertial mass and a connecting shaft, said connecting shaft being connected to said second member and having a stiffness much less than said second member.

6. A transducer which includes a resonant structure comprising:

a first, torsionally vibratile, drive shaft;

a second, torsionally vibratile driven shaft, said drive shaft and driven shaft being connected by an intermediate nexus;

a mounting means supporting a connecting means extending from said mounting means to said nexus, said connecting means having a stiffness substantially greater than said drive shaft;

a sensing element for insertion in a medium and mounted on said driven shaft; and a re-entrant resonator which is connected to and disposed within said sensing element so as to be free from damping by said medium.

7. A transducer according to claim 6 wherein said re-entrant resonator comprises an inertial mass and a connecting shaft, said connecting shaft having a stiffness much less than said driven shaft.

* * * * *